UNITED STATES PATENT OFFICE.

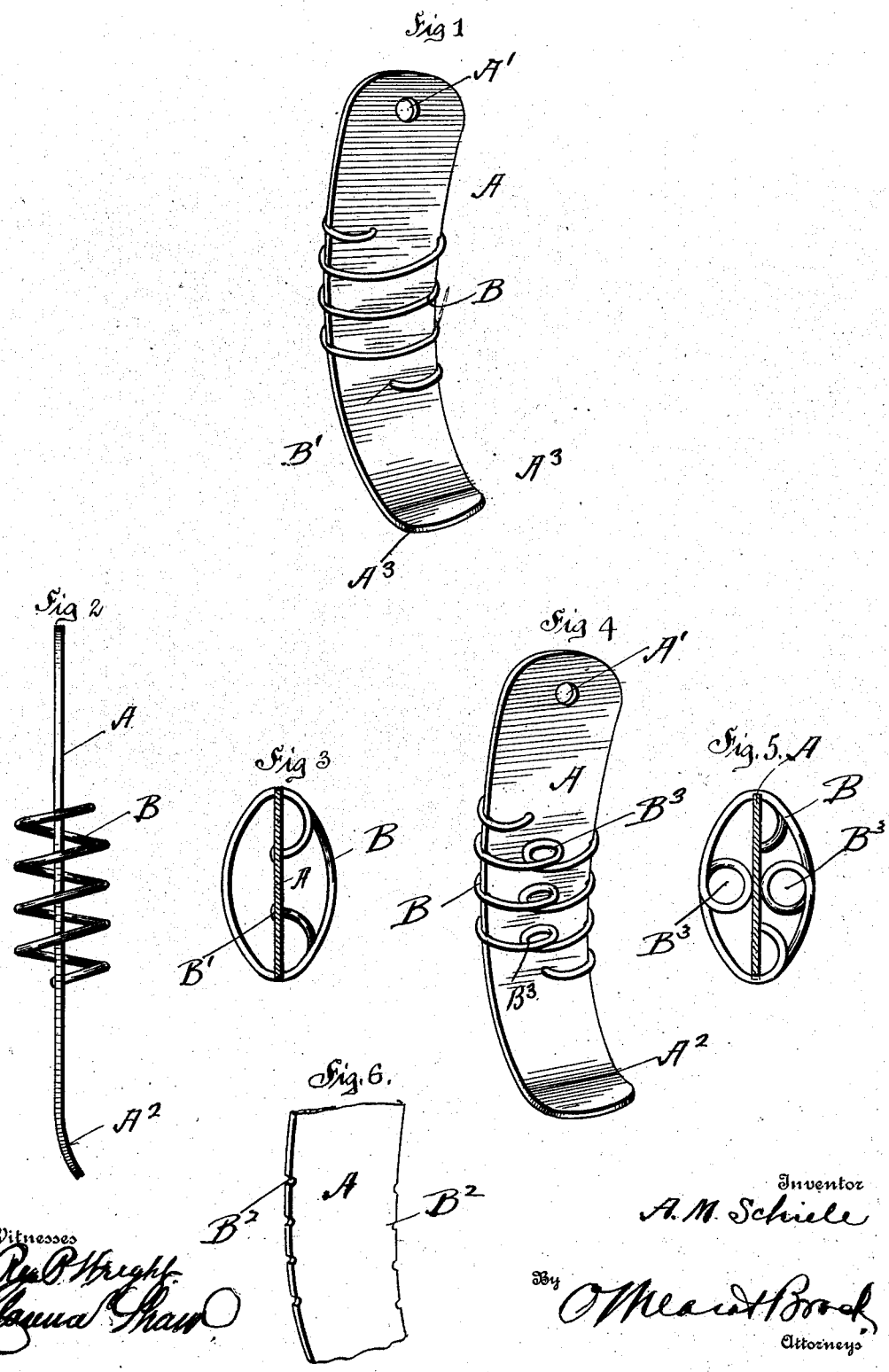

ANNA M. SCHIELE, OF PHILADELPHIA, PENNSYLVANIA.

KETTLE OR POT SCRAPER.

SPECIFICATION forming part of Letters Patent No. 717,456, dated December 30, 1902.

Application filed August 9, 1902. Serial No. 119,127. (No model.)

*To all whom it may concern:*

Be it known that I, ANNA M. SCHIELE, a citizen of the United States, residing at Philadelphia, in the State of Pennsylvania, have invented a new and useful Kettle or Pot Scraper, of which the following is a specification.

This invention is an improved construction of scraper particularly adapted for use in scraping pots and kettles, the object of the invention being to provide a device which shall be exceedingly cheap and simple in construction and one which owing to its peculiar shape can be handled with ease and dexterity and will enable the operator to thoroughly scrape each and every portion of the pot or kettle and without injury to the hands.

With these objects in view the invention consists, essentially, of a thin blade one end of which is curved slightly, said blade being flexible through its entire length, the central portion of said blade having a wire wrapped about the same, thereby providing a convenient construction of handle.

The invention consists also in certain details of construction and novelties of combination, all of which will be fully described hereinafter and pointed out in the claim.

In the drawings, Figure 1 is a perspective view of a scraper constructed in accordance with my invention. Fig. 2 is an edge view. Fig. 3 is a central transverse sectional view. Fig. 4 is a perspective view showing a slightly-modified form of construction. Fig. 5 is a sectional view of such modification. Fig. 6 is a detail perspective view showing the central portion of the blade.

In carrying out my invention I employ a flexible elastic blade A, preferably made of thin steel and which may be of any desired length or width. At one end this blade has a perforation A', by means of which the scraper can be suspended from a nail or hook. The opposite end is curved slightly, as indicated at $A^2$, and the corners of said curved portion are rounded, as shown at $A^3$. A piece of spring-wire B is wound several times around the central portion of the blade in spiral form, the ends of said wire being turned into perforations B', produced in the blade, and in practice I prefer to seat the various coils of the wires in notches $B^2$, produced in the edges of a plate or blade. The wire, coiled and secured in the manner which is described, produces a convenient handle for grasping the scraper during this manipulation, and it will be noted that a handle constructed and connected in this manner will not interfere in the least with the flexibility or elasticity of the scraping-blade.

In Figs. 4 and 5 I have shown a slight modification in the construction of the handle, inasmuch as each turn of the wire is given a coil upon each side of the blade, as indicated at $B^3$, this coil adding to the rigidity of the handle and also serving to keep the main portion of the handle removed from the blade. In other respects, however, the construction and operation of the handle is exactly the same as that shown in Figs. 1, 2, and 3.

By means of a scraper constructed as herein shown and described one is enabled to thoroughly clean or scrape every portion of a pot or kettle without injuring the hands, as the handle provides a convenient grip without interfering with the flexibility or elasticity of the scraping-blade.

Having thus fully described my invention, what I claim as new, and desire to secure by Letters Patent, is—

A scraper of the kind described, consisting of an elastic flexible blade curved at one end, corners of said curved end being rounded, the opposite edges of said blade being notched intermediate its ends, and a spring-wire coiled a number of times around the central portion of the blade, the coils of said wire resting in the notches, the ends of said wire being secured to the blade, as specified.

ANNA M. SCHIELE.

Witnesses:
  CARRIE REDEKER,
  MARGARET BRALTER.